United States Patent [19]

Mancuso

[11] Patent Number: 4,874,274
[45] Date of Patent: Oct. 17, 1989

[54] APPARATUS FOR REMOVING DROSS RIDGES FROM THE SIDES AND ENDS OF A METAL WORKPIECE

[75] Inventor: Matthew A. Mancuso, New Kensington, Pa.

[73] Assignee: Keibler-Thompson Corporation, Kensington, Pa.

[21] Appl. No.: 267,715

[22] Filed: Nov. 4, 1988

Related U.S. Application Data

[63] Continuation of Ser. No. 141,055, Jan. 5, 1988, abandoned.

[51] Int. Cl.$^4$ .............................................. B23D 1/00
[52] U.S. Cl. ...................................... 409/300; 266/69; 266/48; 266/65
[58] Field of Search ........................ 266/69, 64, 65, 48, 266/70, 67, 50, 59; 409/300, 297; 269/17, 269 MR; 51/241 S, 245, 272

[56] References Cited

U.S. PATENT DOCUMENTS

| 1,535,875 | 4/1925 | Sutton . |
| 2,120,316 | 6/1938 | Stone . |
| 2,301,923 | 11/1942 | Babcock . |
| 4,362,448 | 12/1982 | Hasebee et al. . |
| 4,372,538 | 2/1983 | Balfanz .............................. 266/69 |
| 4,390,167 | 6/1983 | Ito et al. . |
| 4,498,821 | 2/1985 | Cazaux . |
| 4,522,540 | 6/1985 | Hasebee et al. . |
| 4,610,586 | 9/1986 | Langeder . |
| 4,615,510 | 10/1986 | Lehmler et al. .................... 266/65 |

FOREIGN PATENT DOCUMENTS 119847 5/1901 Fed. Rep. of Germany .
893605 10/1953 Fed. Rep. of Germany .
261871 8/1970 U.S.S.R. .
971589 11/1982 U.S.S.R. .

OTHER PUBLICATIONS

"Patent Abstracts of Japan", vol. 7, No. 197, (M-239) [1342], Aug. 27, 1983.

Primary Examiner—Leon Scott, Jr.
Attorney, Agent, or Firm—Bell, Seltzer, Park & Gibson

[57] ABSTRACT

An apparatus is disclosed for removing the dross ridges which may be formed on the sides and ends of a metal workpiece during torch cutting of the workpiece. The apparatus includes a workpiece support table and a pair of workpiece transport devices for moving the workpiece both transversely and longitudinally on the table. A plurality of aligned and pivotally mounted cutting blades extend along each side of the table, and a pair of pivotally mounted transverse cutting blades are mounted adjacent respective ends of the table. In operation, the workpiece is moved over the blades along each side of the table, and also over both of the transverse blades, and such that the blades engage and remove the dross ridges along the two sides and the two ends of the workpiece.

17 Claims, 3 Drawing Sheets

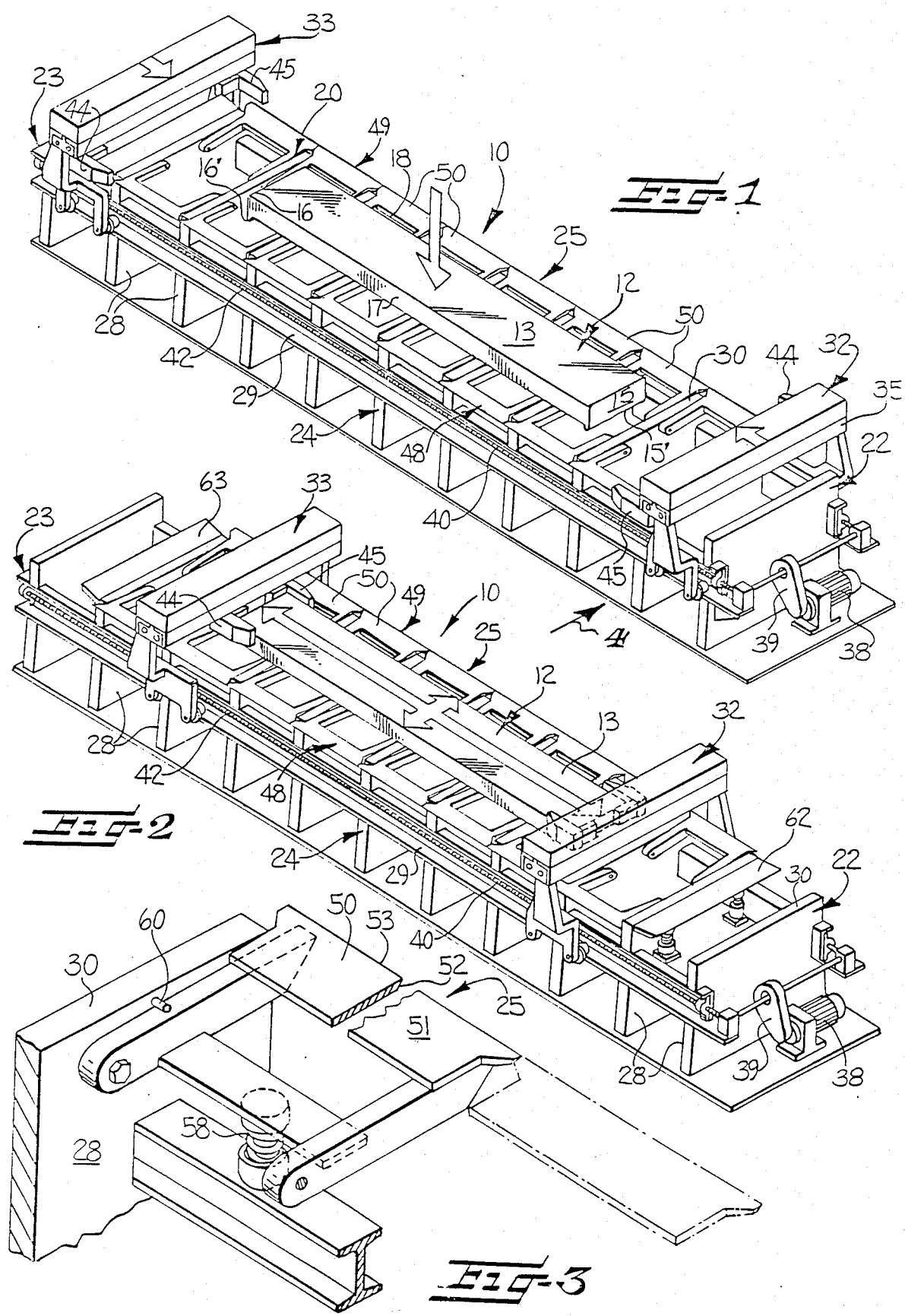

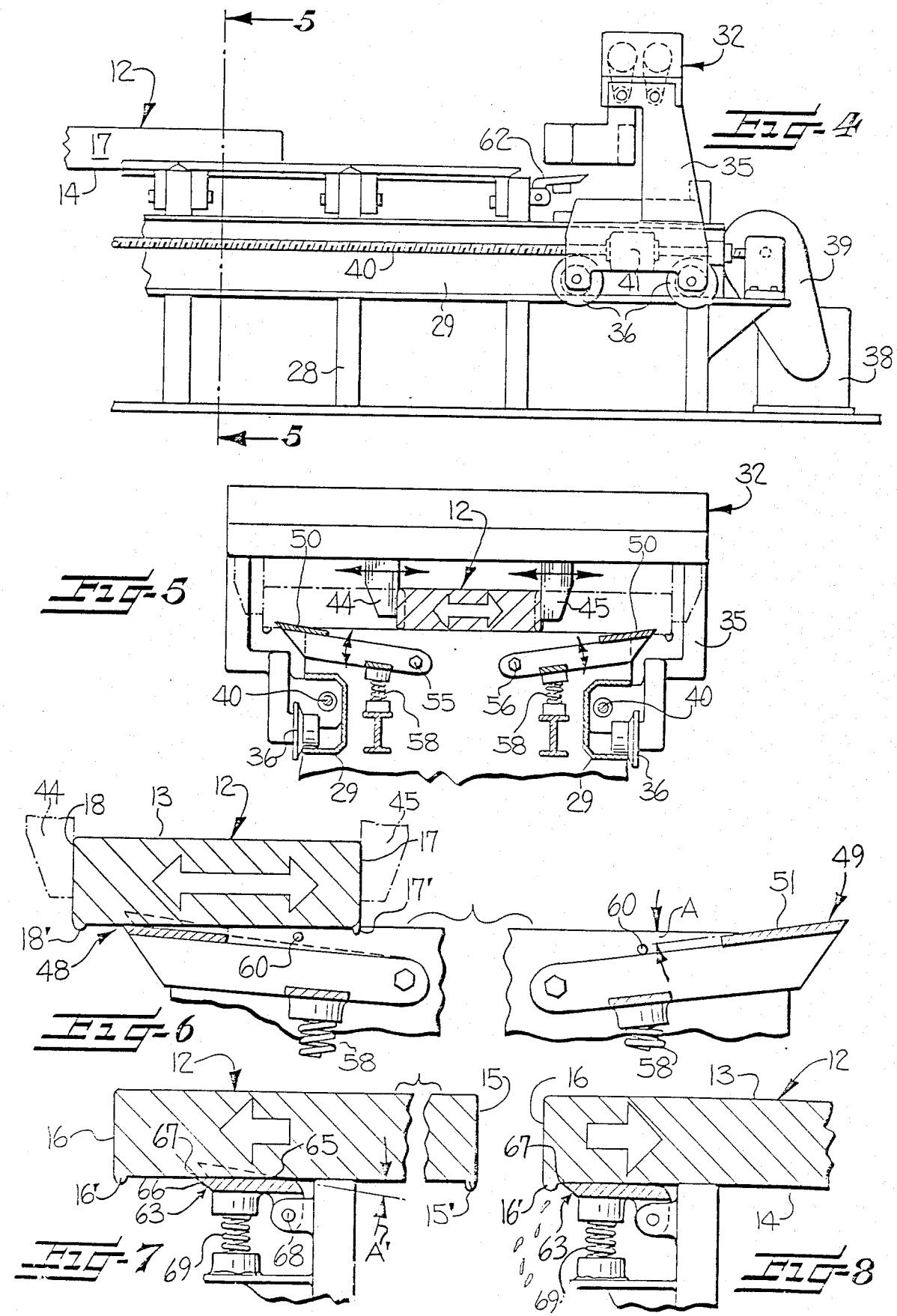

APPARATUS FOR REMOVING DROSS RIDGES FROM THE SIDES AND ENDS OF A METAL WORKPIECE

This application is a continuation of application Ser. No. 141,055 filed Jan. 5, 1988, now abandoned.

BACKGROUND OF THE INVENTION

The present invention relates to an apparatus and method for removing dross ridges from the sides edges and ends of metal workpieces, as slabs, blooms, billets, or the like.

In the production of steel by, for example, the continuous casting process, the continuous casting emerging from the caster is transversely cut into desired lengths and it may also be cut or slit longitudinally to form two or more workpieces of the same length. The resulting separate metal workpieces, which are commonly referred to as slabs or blooms, are then subjected to subsequent processing, as by rolling, to form a finished steel product.

The cutting operations as described above are conventionally performed by means of a flame or torch, wherein a jet of high purity oxygen is directed against the workpiece while it is heated to the oxygen ignition temperature. The resulting exothermic chemical reaction between the iron and oxygen produces slag or waste, which consists of iron oxide, metallic iron and other alloy elements. This slag or waste is in the molten state, and it is displaced during the cutting operation and a portion thereof forms a ridge of the material along the lower edge of the cut. Upon cooling, the material solidifies and adheres to the workpiece surface along the bottom surface adjacent the cut, and forms what is commonly called a "dross ridge".

The formation of the dross ridges on the workpiece presents problems in the further processing thereof. For example, a dross ridge may drop off in the reheat furnace, which requires that it then be removed, thus involving additional labor. Also, in the event the dross ridge remains adhered to the workpiece during reheating, it is laminated into the steel during rolling of the workpiece, resulting in an inferior product.

Heretofore, the dross ridges resulting from a torch cutting operation have been removed by a process involving inverting the workpiece and removing the dross ridges with scarfing torches. However, the required additional handling of the workpiece entails additional equipment and labor. Mechanical chippers or chisels have been employed for this purpose, but this also is a labor intensive process.

U.S. Pat. No. 2,301,923 suggests a process for dross removal which involves immediately cooling the slag as it emerges from the cut, and so that it rapidly solidifies and may be easily removed by a subsequent mechanical operation. This prior patent also states that it has been previously proposed to remove such slag formations from a hot workpiece by means of a shear, but it is indicated that this prior proposal was not entirely satisfactory since the shear was subject to slag accumulation due to its hot condition.

More recent U.S. Pat. No. 4,390,167 discloses the use of rotary metal cutters for removal of slag of the described type from an advancing workpiece, and this patent also discloses that the cutters may take the form of a plurality of tools arranged on a vertically movable mount. However, these cutters appear to be able to remove dross ridges only along one of the ends of the workpiece, and it is believed the cutters would be subject to jamming and would require substantial maintenance.

The copending application of the present inventor, Ser. No. 013,134,, filed February 10, 1987, and entitled Apparatus and Method for Removing Dross Ridges from a Metal Workpiece, discloses in apparatus and method for removing the dross ridges at the two opposite ends of a workpiece, and which avoids many of the limitations and disadvantages of the known prior art procedures. However, this prior invention has no provision for removing dross ridges along the longitudinal sides of the workpiece.

It is an object of the present invention to provide an apparatus and method for efficiently removing dross ridges formed on metal workpieces during a torch cutting operation or the like, which avoids the limitations and disadvantages of the known prior art procedures, and which also is adapted to remove dross ridges from the sides of the workpiece as well as the ends thereof.

It is also an object of the present invention to provide an apparatus for removing dross ridges without requiring the inverting or other complex manipulation of the workpiece.

It is also an object of the present invention to provide an apparatus of the described type and which is characterized by its simplicity of construction and reliability of operation.

It is still another object of the present invention to provide an apparatus of the described type and which is adapted to remove dross ridges from a workpiece which is either hot or cold.

SUMMARY OF THE INVENTION

These and other objects and advantages of the present invention are achieved in the embodiments illustrated herein by the provision of an apparatus which comprises a workpiece support means having opposite ends and opposite side edges, and defining a relatively long longitudinal direction between the ends, and a shorter traverse direction between the side edges. The apparatus also includes workpiece transport means for moving a metal workpiece supported on the support means in opposite transverse directions.

Cutting blade means extend along each side edge of the support means, with each cutting blade means having an outer surface and a longitudinally extending side, and with the junction of the outer surface and the side defining a longitudinally extending cutting edge. Means are also provided for separately mounting each of the cutting blade means of separate pivotal movement about a longitudinal axis which is spaced from said cutting edge, and with the cutting edges thereof facing outwardly from the support means, and means are provided for separately pivoting each of the cutting blade means about its associated longitudinal pivotal axis and so that each cutting edge may be held in contact with the adjacent surface of a workpiece moving transversely across the support means, and such that each cutting blade means is adapted to engage and remove a dross ridge formed on the adjacent workpiece surface when the workpiece is moved transversely across the support means with the dross ridge disposed substantially parallel to the longitudinal direction and opposing the cutting edge.

In the preferred embodiment, the workpiece transport means includes means for also longitudinally moving the metal workpiece in opposite longitudinal directions along the support means, and the apparatus further comprises a transverse cutting blade extending transversely across the support means adjacent each of the ends of the apparatus, with the transverse cutting blades being of similar construction as compared to the side edge cutting blade means, and being adapted to remove dross ridges at the longitudinal ends of the workpiece.

BRIEF DESCRIPTION OF THE DRAWINGS

Some of the objects and advantages of the present invention having been stated, others will appear as the description proceeds when taken in conjunction with the accompanying drawings, in which FIG. 1 is a perspective view of an apparatus for removing dross ridges from a metal workpiece in accordance with the present invention;

FIG. 2 is a view simialr to FIG 1, and illustrating the workpiece transport devices in a position engaging the workpiece;

FIG. 3 is a fragmentary perspective view of one of the cutting blades along a side of the apparatus;

FIG. 4 is a side elevation view of one end portion of the apparatus;

FIG. 5 is a sectional elevation view taken substantially along the line 5—5 of FIG. 4;

FIG. 6 is a fragmentary sectional view similar to FIG. 5, and illustrating the manner in which a workpiece is moved transversely across one of the cutting blades to effect removal of the dross ridge along the side of the workpiece;

FIGS. 7 and 8 are fragmentary sectional views of one of the transverse cutting blades, and illustrating the manner in the which the blade removes a dross ridge from the end of the workpiece;

DETAILED DESCRIPTION OF A PREFERRED EMBODIMENT

Figure 9:
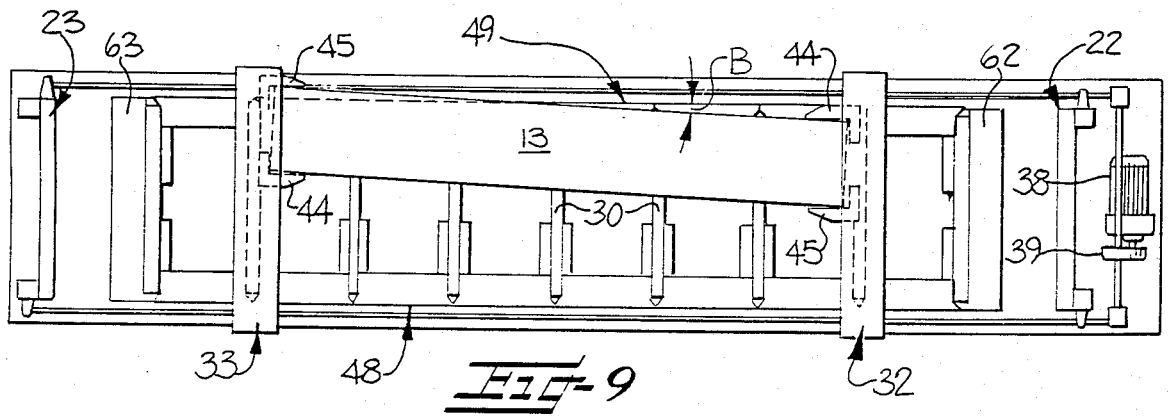
FIG. 9 is a top plan veiw of the apparatus, and wherein the workpiece transport devices are holding the workpiece in a skewed orientation as it is moved over the cutting blades.

Referring more particularly to the drawings, FIGS. 1 and 2 illustrate a dross ridge removal apparatus which is generally indicated at 10. The apparatus 10 is adapted to be used in association with a conventional steel casting installation, which is not shown, and such casting installations typically include an oxygen cutting torch and apparatus which severs the continuous casting into separate slabs, or blooms. Also, torches commonly cut the castings along their longitudinal length, and thus the resulting product, which is hereinafter referred to as a workpiece 12, may have a dross ridge along each end and along one or both sides.

In the illustrated embodiment, the workpiece 12 is of rectangular, block-like configuration, having parallel upper and lower surfaces 13, 14, opposite ends 15, 16, and opposite sides 17, 18. A dross ridge is formed along each end as indicated at 15' and 16' respectively (note FIG. 7) and a dross ridge is also formed along each side as indicated at 17' and 18' respectively (note FIG. 6).

The apparatus 10 includes horizontal work support table 20 which is designed to receive workpiece 12 from the caster, with the workpiece being placed on the support table 20 by means of an overhead crain or the like, and as schematically indicated by the vertical arrow in FIG. 1. Also, the workpiece support table 20 includes opposite ends 22, 23 and opposite side edges 24, 25, which are parallel to each other, and thus the apparatus defines an elongate longitudinal direction between the ends, and a shorter transverse direction between the side edges.

The support table 20 is composed of a framework of vertically disposed plates 28, which are interconnected along each side by a guide rail 29. Also, the vertical plates 28 each have a horizontal upper edge surface 30, with the upper edge surfaces 30 of the several plates defining a horizontal and planar support surface for the workpieces.

The apparatus 10 also includes workpiece transport devices 32, 33 adjacent respective ends 22, 23, for moving the workpiece in opposite transverse directions, as well as in opposite longitudinal directions. More particularly, each workpiece transport device 32, 33 includes a frame 35 mounted for longitudinal movement along the apparatus by means of wheels 36 which are received in the longitudinal guide rails 29, note FIG. 4. Two separate drives are provided for longitudinally moving the two devices in the longitudinal directions. More particularly, the drive for the transport device 32 includes a drive motor 38 at the end 22 of the apparatus as seen in FIGS. 1 and 2, and the drive motor 38 acts through a suitable transmission 39 to rotate a pair of drive screws 40 which extend longitudinally along respective sides of the apparatus for about one-half its longitudinal length. Each drive screw 40 is threadedly connected to a drive nut 41 (FIG. 4) which is fixed to the transport device 32, and thus each side of the transport device 32 is positively driven. As will be understood, a similar drive motor and transmission are mounted adjacent the other end 23 of the apparatus for rotatably driving the pair of drive screws 42 which are associated with the other transport device 33 in a similar manner. By this arrangement, the two transport devices 32, 33 may by selectively moved toward or away from each other in the longitudinal direction, or they may be moved together in the same longitudinal direction.

Each of the transport devices 32, 33 also includes a pair of transversely movable gripper arms, 44, 45, which are adapted to move toward and away from each other so as to engage the sides of the workpiece 12, note FIG. 5. The gripper arms 44, 45 are also adapted to move together in the transverse direction so that the workpiece can be moved in opposite transverse directions. The drive mechanism for moving the gripper arms 44, 45 in this fashion is of conventional design, and is thus not specifically illustrated herein. As an example, the drive mechanism may be composed of a first drive and lead screw for opening and closing the arms 44, 45, and a second drive for transversely moving an assembly which mounts both arms and the first drive and lead screw.

The apparatus 10 further includes longitudinal cutting blade means 48, 49 extending along each side edge of the support table 20. More particularly, each cutting blade means comprises a plurality of separate blades 50 which are aligned along the associated side edge of the support table. Each blade 50 has an outer flat surface 51 and an outer side 52, and so as to define a longitudinally extending cutting edge 53 at the junction of the side and the outer surface. Each of the blades 50 on each of the sides of the apparatus is mounted for separate pivotal movement about a common longitudinal axis 55 or 56 (FIG. 5), which is spaced inwardly from the cutting edge 53. Also, each of the cutting blades 50 is biased by a spring 58 so as to pivot the blade upwardly about the pivotal axis. In addition, an abutment 60 (FIG. 3) is fixed to one of the plates 28 adjacent each blade for limiting such pivotal movement from the action of the spring to a predetermined position wherein the generally flat outer surface 51 of the blade intersects the plane of the support surface, and such that the associated cutting edge 53 is on the side of such plane opposite its pivotal axis. The angle A (FIG. 6) between the flat outer surface 51 of the blade and the plane of the support surface should be between about 0 to 30 degrees when the cutting blade is at the predetermined position as defined by the abutment, and preferably, the angle A is about 0-10 degrees.

The apparatus 10 further includes a first transverse cutting blade 62 which extends transversely across the support table along the end 22 thereof, and a second transverse cutting blade 63 which extends transversely across the support table along the other end 23 thereof. The first and second transverse cutting blades are of like construction, and the second transverse cutting blade 63 is illustrated in FIGS. 7 and 8. More particularly, the second blade 63 comprises a generally flat outer surface 65 and a straight side 66, with the junction of the side 66 and the outer surface 65 defining a straight cutting edge 67. The cutting blade 63 is mounted for pivotal movement about a transverse axis 68, which is spaced from and parallel to the cutting edge thereof, and means in the form of a spring 69 is provided for pivoting the cutting blade 63 about the pivotal axis 68. Thus in its normal position which is illustrated in dashed lines in FIG. 7, the outer surface intersects the plane of the support surface by the angle A', which is preferably the same magnitude as the angle A described above. The blade 63 is adapted to be pivoted to be pivoted downwardly by the workpiece moving thereacross to the solid line position as shown in FIG. 7, and the cutting edge of the blade will be held in contact with the adjacent surface 14 of a workpiece 12 by the spring 69. Also, the cutting edge is adapted to engage and remove a dross ridge 16' formed on the adjacent workpiece surface when the workpiece is moved in the direction which opposes the cutting edge and as seen in FIG. 8.

To now more completely describe the operation of the apparatus, it will be assumed that a workpiece 12 has been delivered onto the support table by an overhead crain to the position shown in FIG. 1. The transport devices 32, 33 are then moved toward each other, and the gripper arms 44, 45 are closed to engage the ends of the workpiece. The workpiece is then shifted transversely to one side of the table as shown for example in FIG. 6, with the side of the workpiece engaging the flat surface of the blades 50 along that side so as to depress the blades downwardly against the force of the springs 58. The workpiece is then moved in the opposite transverse direction so that the cutting edge engages and removes the dross ridge. This process is duplicated at the opposite side of the table, to remove the dross ridge on the other side of the workpiece, and as indicated in dashed lines in FIG. 5.

The transport devices 32, 33 are next moved together so as to move the workpiece longitudinally, and until the end of the workpiece moves across the transverse cutting blade 63 as seen in FIG. 7. The advance of the workpiece is then terminated and reversed, so that the cutting edge 67 of the blade 63 engages and removes the dross ridge 16' at the end 16 of the workpiece, as seen in FIG. 8. Next, the transport devices 32, 33 move the workpiece longitudinally to the other end 22 of the table, and the process is repeated with respect to the transverse blade 62 and so as to remove the dross ridge 15' at the end 15 of the workpiece.

FIG. 9 schematically illustrates a modified embodiment of the method of operation, and wherein the workpiece 12 is skewed as it is moved over the cutting blade means 48, 49 along each side of the support table 20. More particularly, when the dross ridge on the side is opposite the longitudinal blade as seen in FIG. 6, the arms 44, 45 on the transport device 32 will start to move first so that the dross ridge first engages the blade near the device 32. Once the workpiece is skewed to a desired degree B with respect to the edge 53 of the blade, the other transport device 33 begins movement. The angle B is preferably between about 1 to 5 degrees. Such skewing reduces the amount of force required to remove the dross ridge.

The workpiece can also be skewed when removing the dross ridges 15' or 16' at the ends of the workpiece. Here again, when the dross ridge is opposite the cutting edge as seen in FIG. 7, the workpiece can be skewed on the support surface by transversely moving the arms 44, 45 on the transport devices 32, 33 to different positions as shown in FIG. 9, and so that the end edges are skewed at about the same angle B with respect to the blades 62, 63. The workpiece is then moved longitudinally as described above, to remove the dross ridges 15', 16'.

Figure 10:
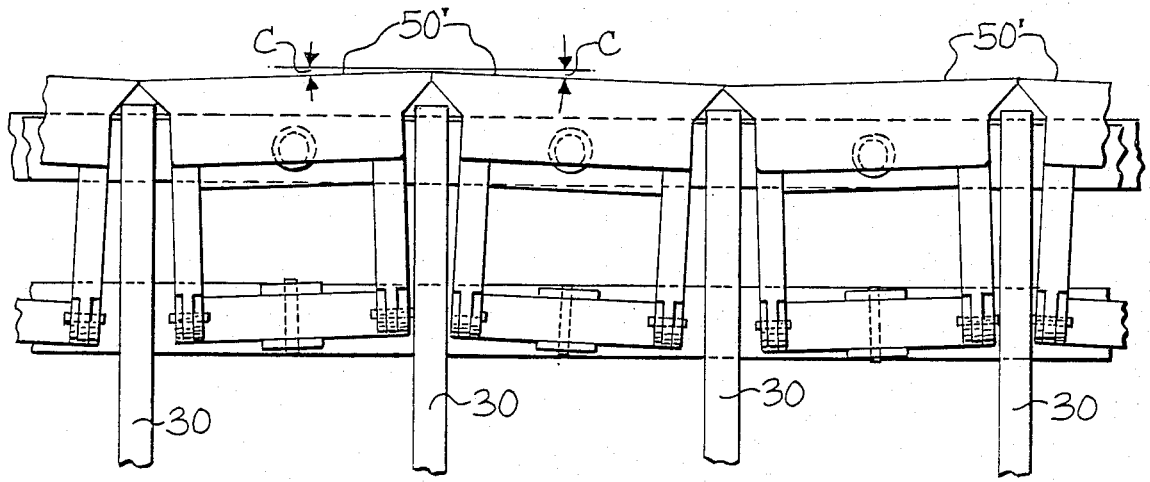
FIG. 10 is a fragmentary top plan view of a modified form of the cutting blades.

FIG. 10 illustrates a further embodiment of the invention, and wherein the blades 50' are oriented in a "sawtooth" arrangement, and wherein adjacent blades are disposed at an angle C of for example 5° when viewed in plan. This arrangement of the blades also reduces the impact force between the dross ridge and blades 50', and also helps prevent the workpiece from shifting during the removal operation.

Figure 11:
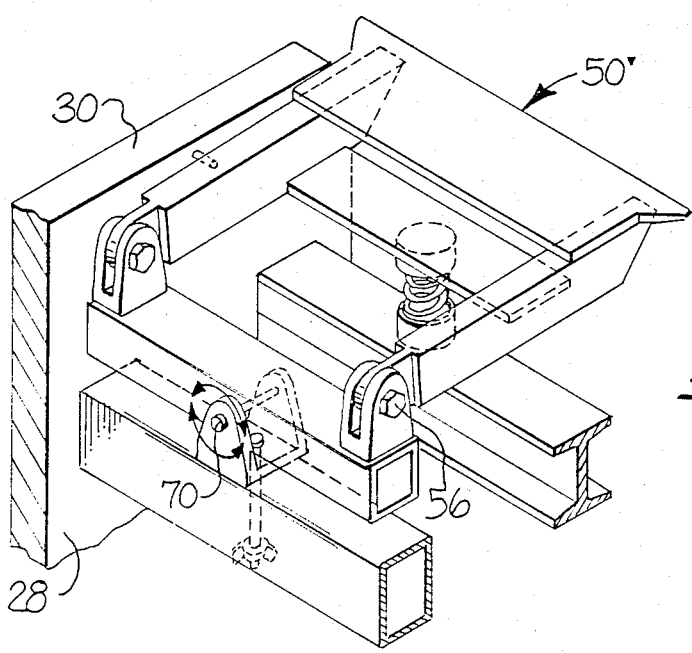
FIG. 11 is a fragmentary perspective view of the cutting blades shown in FIG. 10.

FIG. 11 illustrates the mounting arrangement for the blades 50'. More particularly, the blades 50' are each mounted for pivotal movement about a transverse aixs 70. By this mounting construction, the blades are able to follow and conform to the contour of a slightly bowed workpiece.

In the drawings and specification, preferred embodiments of the invention have been illustrated and described, and although specific terms are employed, they are used in a generic and descriptive sense and not for purposes of limitation.

That which is claimed is:

1. An apparatus for removing a dross ridge along a side edge of a metal workpiece of the type resulting from a torch cutting operation or the like, and comprising workpiece support means having opposite ends and opposite side edges, and defining a longitudinal direction between said ends, and a transverse direction between said side edges, workpiece transport means for moving a metal workpiece supported on said support means in opposite transverse directions, cutting blade means extending along at least one side edge of said support means, with said at least one cutting blade means comprising a plurality of separate blades which are aligned along the associated side edge of said support means, and wherein each of said blades includes an outer generally flat surface and a longitudinally extending side, and with the junction of the outer surface and the side defining a longitudinally extending cutting edge, means mounting each of said blades for separate pivotal movement about a longitudinal axis which is spaced from said cutting edge, and with the cutting edges thereof facing outwardly from said support means, and means for separately biasing each of said blades about its associated longitudinal pivotal axis in a direction toward the adjacent surface of a workpiece supported on said support means, and so that each cutting edge may be held in contact with the adjacent surface of a workpiece moving transversely across said support means, and such that said at least one cutting blade means is adapted to engage and remove a dross ridge formed on the adjacent workpiece surface when the workpiece is moved in a transverse direction across said support means with the dross ridge disposed substantially parallel to the longitudinal direction and opposing said cutting edge.

2. The apparatus as defined in claim 1 wherein said workpiece support means defines a planar support surface, and wherein said means for separately biasing each of said blades further includes abutment means for limiting such pivotal movement from the action of said biasing means to a predetermined position wherein the generally flat outer surface of each blade intersects the plane of said support surface and wherein the cutting edge of each blade is on the side of said plane opposite its associated longitudinal pivotal axis.

3. An apparatus for removing a dross ridge along each side edge of a metal workpiece of the type resulting from a torch cutting operation or the like, and comprising workpiece support means having opposite ends and opposite side edges, and defining a longitudinal direction between said ends, and a transverse direction between said side edges, workpiece transport means for moving a metal workpiece supported on said support means in opposite transverse directions, cutting blade means extending along each side edge of said support means, with each cutting blade means having an outer surface and a longitudinally extending side, and with the junction of the outer surface and the side defining a longitudinally extending cutting edge, means mounting each of said cutting blade means for separate pivotal movement about a longitudinal axis which is spaced from said cutting edge, and with the cutting edges thereof facing outwardly from said support means, and means for separately pivoting each of said cutting blade means about its associated longitudinal pivotal axis and so that each cutting edge may be held in contact with the adjacent surface of a workpiece moving transversely across said support means, and such that each cutting blade means is adapted to engage and remove a dross ridge formed on the adjacent workpiece surface when the workpiece is moved in a transverse direction across said support means with the dross ridge disposed substantially parallel to the longitudinal direction and opposing said cutting edge.

4. The apparatus as defined in claim 3 wherein each of said cutting blade means comprises a plurality of separate blades which are aligned along the associated side edge of said support means, and wherein said blades are each separately pivotable about a generally longitudinal pivotal axis.

5. The apparatus as defined in cliam 4 wherein said means for separately pivoting each of said cutting blade means includes means for biasing each of said separate blades in a direction toward the adjacent surface of a workpiece support on said support means.

6. The apparatus as defined in claim 5 wherein said outer surface of each of said separate blades in generally flat, and said cutting edge of each blade is straight.

7. The apparatus as defined in claim 6 wherein the cutting edges of adjacent blades along each of said side edges are angularly offset with respect to each other when viewed in plan, and so as to provide a "sawtooth" like configuration.

8. The apparatus as defined in claim 6 wherein each of said blades along each of said side edges are mounted for pivotal movement about a transverse axis, so as to permit each of said blades to conform to a slightly bowed workpiece.

9. The apparatus as defined in claim 6 wherein said workpiece support means defines a planar support surface, and wherein said means for separately pivoting each of said blades further includes abutment means for limiting such pivotal movement from the action of said biasing means to a predetermined position wherein the generally flat outer surface of each blade intersects the plane of said support surface and wherein the cutting edge of each blade is on the side of said plane opposite its associated longitudinal pivotal axis.

10. The apparatus as defined in claim 9 wherein the angle between said flat outer surface of each blade and said plane of said support surface is about 0 to 10 degrees when such blade is at said predetermined position.

11. The apparatus as defined in claim 3 wherein said longitudinal sides of said cutting blade means along the two side edges of said support means are parallel to each other, and wherein said workpiece transport means includes means for engaging the longitudinal ends of the workpiece and skewing the workpiece with respect to said longitudinal sides.

12. The apparatus as defined in claim 3 wherein said workpiece transport means includes means for longitudinally moving a metal workpiece in opposite longitudinal directions along said support means, and wherein said apparatus further comprises first and second transverse cutting blades extending transversely across said support means, each of said transverse cutting blades having an outer surface and at least one side, and with the junction of said side and said outer surface defining a straight cutting edge, means mounting each of said transverse cutting blades for pivotal movement about a respective transverse axis which is a spaced from and parallel to said cutting edge thereof, and with said cutting edges of said blades facing in opposite longitudinal directions, and means for pivoting each of said transverse cutting blades about its associated transverse pivotal axis and so that said cutting edge thereof may be held in contact with the adjacent surface of a workpiece moving along said support means, and such that each of said transverse cutting blades is adapted to engage and remove a dross ridge formed on the adjacent workpiece surface when the workpiece is moved longitudinally across said support means with the dross ridge disposed substantially perpendicular to the longitudinal direction and opposing said cutting edge.

13. The apparatus as defined in claim 12 wherein said first and second transverse cutting blades are positioned adjacent respective ones of said ends of said workpiece support means.

14. An apparatus for removing a dross ridge along each side and each end of a metal workpiece of the type resulting from a torch cutting operation or the like, and comprising workpiece support means having opposite ends and opposite side edges, and defining an elongate longitudinal direction between said ends, a transverse direction btween said side edges, and a horizontal and planar support surface, workpiece transport means for moving a metal workpiece supported on said support means in opposite transverse directions and in opposite longitudinal directions, longitudinal cutting blade means extending longitudinally along each side edge of said support means, with each longitudinal cutting blade means having an outer surface and at least one longitudinally extendin side, and with the junction of said outer surface and said side defining a longitudinally extending cutting edge, first and second transverse cutting blades extending transversely across said support means adjacent respective ends thereof, with each of said transverse cutting blades having an outer surface and an outer side, and with the junction of said outer surface and said side defining a straight cutting edge, means mounting each of said longitudinal cutting blade means for separate pivotal movement about a longitudinal axis which is spaced from said cutting edge, with the cutting edges thereof facing outwardly from said support means, means mounting each of said first and second transverse cutting blades for separate pivotal movement about a transverse axis which is spaced from the associated cutting edge, with the cutting edges thereof facing outwardly from said support means, means for separately biasing each of said longitudinal cutting blade means and each of said first and second transverse cutting blades for pivotal movement about its associated pivotal axis and so that each cutting edge may be held in contact with the adjacent surface of a workpiece moving thereacross, and such that each cutting edge is adapted to engage and remove a dross ridge formed on the adjacent workpiece surface when the workpiece is moved across said support means in a direction opposing the associated cutting edge and with the dross ridge opposing said cutting edge.

15. The apparatus as defined in claim 14 wherein said outer surface of each cutting blade means and each of said transverse cutting blades is gererally flat, and sid cutting edge of each cutting blade means and each of said transverse cutting blades is straight, and wherein said means for separately biasing each of said longitudinal cutting blade means and each of said transverse cutting blades acts to bias the same to a predetermined position wherein the generally flat outer surfaces intersect the plane of said support surface and wherein each associated cutting edge is on the side of said plane opposite its associated pivotal axis.

16. The apparatus as defined in claim 15 wherein each of said longitudinal cutting blade means comprises a plurality of separate blades which are aligned along the associated side edge of said support means, and wherein said blades are separately pivotable about a common longitudinal pivotal axis.

17. The apparatus as defined in claim 15 wherein the angle between said flat outer surfaces of each longuitudinal cutting blade means and said plane of said support surface is about 0 to 10 degrees when at said predetermined position, and wherein the angle between said flat outer surfaces of each of said transverse cutting blades and said plane of said support surface is about 0 to 10 degrees when at said predetermined position.

* * * * *

UNITED STATES PATENT AND TRADEMARK OFFICE
CERTIFICATE OF CORRECTION

PATENT NO. : 4,874,274

DATED : October 17, 1989

INVENTOR(S) : Matthew A. Mancuso

It is certified that error appears in the above-identified patent and that said Letters Patent is hereby corrected as shown below:

On the face of the patent under "References Cited",
  please add -- 882715 11/1981 U.S.S.R. --

Column 5, line 38, the second occurrence of "to be pivoted" should be deleted

Column 6, line 19, "5" should be -- 15 --

Column 9, line 27, "extendin" should be -- extending --

Column 10, line 18, "gererally" should be -- generally --

Column 10, line 18, "sid" should be -- said --

Signed and Sealed this

Eighteenth Day of December, 1990

Attest:

HARRY F. MANBECK, JR.

*Attesting Officer*  *Commissioner of Patents and Trademarks*